(12) United States Patent
Sainthuile

(10) Patent No.: US 6,587,757 B2
(45) Date of Patent: Jul. 1, 2003

(54) METHOD FOR GUIDING AN AIRCRAFT DURING A CONVOY FLIGHT

(75) Inventor: Gérard Sainthuile, Orsay (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/148,904

(22) PCT Filed: Oct. 19, 2001

(86) PCT No.: PCT/FR01/03254

§ 371 (c)(1), (2), (4) Date: Jun. 20, 2002

(87) PCT Pub. No.: WO02/35497

PCT Pub. Date: May 2, 2002

(65) Prior Publication Data

US 2002/0183900 A1 Dec. 5, 2002

(30) Foreign Application Priority Data

Oct. 27, 2000 (FR) .............................. 00 13846

(51) Int. Cl.⁷ .......................... G05D 1/02; G06F 17/12; G06F 7/00; G06F 19/00
(52) U.S. Cl. ................... 701/1; 701/3; 701/8; 701/121; 701/301; 340/961; 342/29; 342/455
(58) Field of Search ............................... 701/1, 3, 7, 8, 701/120, 121, 122, 301; 340/961; 342/29, 455

(56) References Cited

U.S. PATENT DOCUMENTS

| 4,674,710 | A | * | 6/1987 | Rodriguez ................ 244/76 R |
| 5,521,817 | A | | 5/1996 | Burdoin et al. |
| 5,906,336 | A | | 5/1999 | Eckstein |
| 6,061,612 | A | | 5/2000 | Sainthuile et al. |
| 6,393,358 | B1 | * | 5/2002 | Erzberger et al. ............ 701/120 |
| 2002/0080059 | A1 | * | 6/2002 | Tran ............................ 342/29 |
| 2003/0004642 | A1 | * | 1/2003 | Lin et al. ...................... 701/301 |
| 2003/0014165 | A1 | * | 1/2003 | Baker et al. .................... 701/3 |
| 2003/0016159 | A1 | * | 1/2003 | Stayton et al. ................ 342/30 |

FOREIGN PATENT DOCUMENTS

| FR | 2 632 755 | 12/1989 |
| WO | 00 41154 | 7/2000 |

* cited by examiner

Primary Examiner—Thomas G. Black
Assistant Examiner—Ronnie Mancho
(74) Attorney, Agent, or Firm—Oblon, Spivak, McClelland, Maier & Neustadt, P.C.

(57) ABSTRACT

The invention relates to compliance with the safety distances between aircraft travelling, in a queue, one behind the other, through a prescribed air corridor. It is more especially concerned with a process allowing an aircraft knowing its position and those of the various aircraft flying in its close vicinity, for example by virtue of the ADS-B system, to manage by itself its separation distance with respect to another aircraft taken as reference. Such a process is an aid afforded to the crew of an aircraft and to the control authority regulating the traffic in the relevant air corridor.

21 Claims, 2 Drawing Sheets

METHOD FOR GUIDING AN AIRCRAFT DURING A CONVOY FLIGHT

Figure 1:
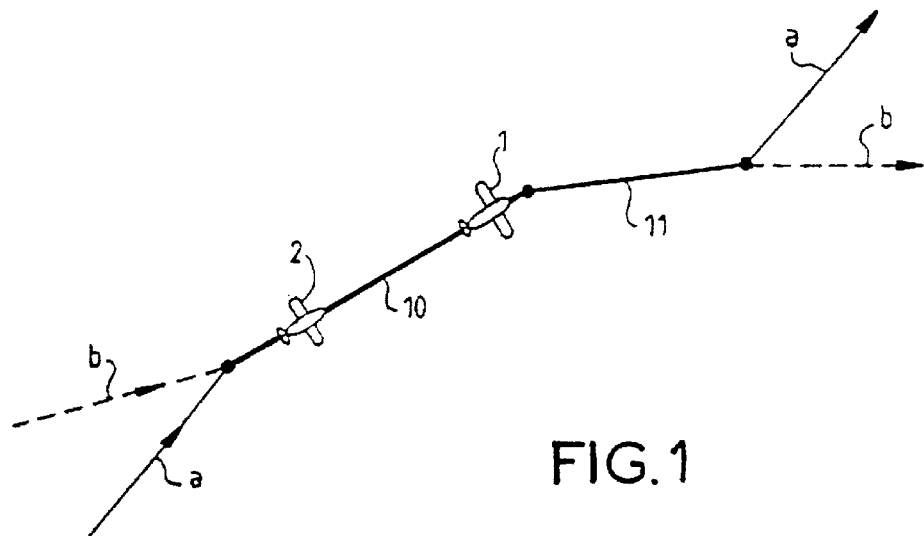

The present invention relates to the guidance of an aircraft so as to allow it, once inserted into the traffic of an air corridor, to retain a minimum distance of separation with the aircraft preceding it so as to prevent any risk of collision.

The problem of insertion into the traffic of an air corridor, know as "follow traffic", arose right from the beginnings of aviation, in respect of access to runways and has long been solved solely by the technique of fly by sight which consists, in respect of the pilot of an aircraft, in carrying out visual surveillance of his vicinity in order to tag the other aircraft flying nearby and especially any aircraft which may be preceding him on the same trajectory, and to act on his throttle sticks so as to preserve an apparent distance relative to this aircraft which is sufficient to avoid any risk of collision. This technique, still widely carried out, in the context of highly regulated procedures, is safe only in the event of good visibility and light traffic. Should the air traffic be somewhat heavy such as over Europe or the North American continent, the technique of fly by sight is used alongside the routing of the aircraft from the ground, by air controllers who assign positions and speeds to the various aircraft allowing them to insert themselves into the traffic of an air corridor while complying with the minimum separation distances between aircraft eliminating the risks of collision. However, even strengthened by traffic regulation by an air control authority, the safety of the fly by sight technique depends on the visibility conditions so that, in order to maintain one and the same safety level, the poorer the visibility conditions, the larger must be the minimum spacing between aircraft.

Navigation and radiocommunication equipment having progressed in terms of reliability and accuracy, it is envisaged that the extent of the domain of action of air controllers be limited to zones of heavy traffic with prescribed air corridors and that, outside of these zones, that is to say in the higher space, aircraft be granted mastery of their navigation so as to ensure better traffic flow. The downside of this autonomy of navigation in higher space is the need for the aircraft to ensure their anticollision safety by themselves. With this aim, and that of better safety, it is proposed to equip aircraft with a so-called "ADS-B" system, the initials standing for "Automatic Dependent Surveillance Broadcast", via which an aircraft informs the various other aircraft flying nearby and the terrestrial air control stations within its range, of its position and its speed vector, either periodically or when interrogated.

An aircraft flying amid traffic consisting of other aircraft equipped with the ADS-B system is able to ascertain its situation relative to the various other aircraft and to forecast, in the short and medium term, the way in which this situation will alter and hence the collision risks incurred in the short and medium term, if no correction is made to the trajectories of the various relevant aircraft. Armed with this knowledge, it is capable of modifying its trajectory or of requesting another aircraft to modify its trajectory so as to eliminate risks of collision. Various methods directly usable by airborne navigation computers onboard aircraft have already been proposed for detecting the risks of collisions with other aircraft and for determining the course corrections allowing these risks to be eliminated at the cost of a minimum detour.

It is proposed here that the knowledge which an aircraft possesses, ever more often, of its position and its speed vector as well as of the positions and speed vectors of the various other aircraft flying nearby, by virtue of the ADS-B system and also by virtue of other systems such as airborne radars or means for communicating with ground tagging stations, be used to automate the maintaining of a longitudinal safety distance relative to another aircraft preceding it along its scheduled course. This additional aid afforded to the crew of the aircraft and to any air control authority involved is able to reduce the spacing between aircraft for one and the same safety level and hence to increase the traffic in an air corridor.

The subject of the invention is a process for guiding a so-called slave aircraft in the context of a convoy flight, behind another so-called master aircraft, on one and the same predetermined trajectory and with a preset minimum separation distance $D_{SEP}$, consisting in giving the calculated air speed $V_{CAS,S}$ of the slave aircraft, that is to say calculated from measurements of temperature and static and dynamic pressures and known as "Calculated Air Speed", an initial value $V_{CAS0,S}$, in periodically deducing the distance separating the slave aircraft from the master aircraft from the geographical position of the slave aircraft and from that of the master aircraft at one and the same instant, and from the known shape of the trajectory followed by the master and slave aircraft, then in periodically correcting the calculated air speed $V_{CAS,S}$ of the slave aircraft by modifying it with a corrective term E derived from the discrepancy noted between the measured separation distance D and the preset minimum separation distance $D_{SEP}$, this guidance process being defined by a recurrence relation of the form:

$$\begin{cases} V_{CAS,S}(t_0) = V_{CAS0,S}(t_0) \\ V_{CAS,S}(t_0 + k\Delta t) = V_{CAS,S}(t_0 + (k-1)\Delta t) + \\ \quad E((D_{SEP} - D_M), (t_0 + (k-1)\Delta t)) \end{cases}$$

$\Delta t$ being the periodicity of the correction.

Advantageously, the initial value of the calculated air speed of the slave aircraft is taken equal to the calculated air speed scheduled during the preparation of the flight plan of the slave aircraft 2 at the place where it is situated at the moment of implementation of the guidance process, this calculated air speed resulting from the application of a 4D defining law, that is to say dependent on the four variables: altitude, time, latitude and longitude, this case being tailored to a situation where the aircraft is descending, for example, on the approach to a runway.

Advantageously, the initial value of the calculated air speed of the slave aircraft is taken equal to a calculated air speed and adopted in order to optimize consumption. This is applied to the case where the slave aircraft is cruising.

Advantageously, the initial value of the calculated air speed of the slave aircraft is taken equal to the calculated air speed of the master aircraft 1 at the moment at which it passed substantially the same point of the trajectory.

Advantageously, one is given a so-called effective margin of tolerance $\Delta L_e$, as a percent, in the measured distance $D_M$ relative to the preset distance $D_{SEP}$ below which the corrective term E takes a zero value and above which the corrective term takes a non zero value.

Advantageously, a hysteresis phenomenon is introduced around the effective margin of tolerance $\Delta L_e$, by giving the latter a reduced value upon each detection of its overshoot, doing so as long as the overshoot lasts.

Advantageously, in the case where there is a preset margin of tolerance $\Delta L_c$, an effective tolerance margin $\Delta L_e$ which is stricter than the preset tolerance margin $\Delta L_c$ is adopted by applying a positive safety coefficient k' of less than 1 to the preset tolerance margin $\Delta L_c$, for example 0.8 so that the preset tolerance margin $\Delta L_c$ is never reached:

$$\Delta L_e = k' \Delta L_c \text{ with } 0 < k' \leq 1$$

Advantageously, in the case where the effective tolerance margin $\Delta L_e$ is deduced from a preset tolerance margin $\Delta L_c$ by applying a safety coefficient k', a hysteresis phenomenon is introduced around the effective tolerance margin $\Delta L_e$ by giving the latter, when it has just been overshot, a reduced value deduced from the preset tolerance margin $\Delta L_c$ by applying a positive hysteresis coefficient k" of less than the safety coefficient k', for example, taken equal to 0.5; doing so for as long as the overshoot lasts.

Advantageously, the corrective term E is taken proportional to the discrepancy noted between the measured separation distance D and the preset minimum separation distance $D_{SEP}$ with a coefficient of proportionality p taken equal to:

$$p = S_{ep} \times M$$

with:

$$S_{ep} = 1 \text{ if } \begin{cases} \frac{|(D_M - D_{SEP})|}{D_{SEP}} > k' \times \Delta L_c \text{ and } S_{ep} = 0 \text{ a priori} \\ \text{or} \\ \frac{|(D_M - D_{SEP})|}{D_{SEP}} > k'' \times \Delta L_c \text{ and } S_{ep} = 1 \text{ a priori} \end{cases}$$

and $$S_{ep} = 0 \text{ if } \begin{cases} \frac{|(D_M - D_{SEP})|}{D_{SEP}} < k'' \times \Delta L_c \text{ and } S_{ep} = 1 \text{ a priori} \\ \text{or} \\ \frac{|(D_M - D_{SEP})|}{D_{SEP}} < k' \times \Delta L_c \text{ and } S_{ep} = 0 \text{ a priori} \end{cases}$$

$\Delta L_c$ being a preset tolerance percentage, k' a positive safety coefficient less than one, k" a hysteresis coefficient and M a consistency coefficient for making the distance homogeneous in relation to the speed.

Advantageously, the consistency coefficient M is taken equal to:

$$M = \frac{120 \text{ kts}}{1 \text{ NM}}$$

kts being a speed in knots and NM a nautical mile.

Advantageously, the measured separation distance $D_M$ is the horizontal component of the true separation distance.

Advantageously, the measurement of the distance $D_M$ separating, at a given instant, the slave aircraft from the master aircraft on a rectilinear trajectory, is taken equal to:

$$D_M = R \times \text{Arc } \cos(\cos(Lat_S) \times \cos(Lat_S) \times \cos(Long_M - Long_S) + \sin(Lat_M) \times \sin(Lat_s))$$

$Lat_M$ and $Long_M$ defining the geographical position of the master aircraft, $Lat_S$ and $Long_S$ the geographical position of the slave aircraft and R being the radius of the earth.

Advantageously, the distance separating, at a given instant, the slave aircraft from the master aircraft while the slave aircraft is situated on a rectilinear part, with heading $\chi_P$, of the trajectory followed by the two aircraft, and the master airplane on another rectilinear part, with heading $\chi_S$, of this trajectory, which are joined together by an arc of a circle of radius r, starting at a point $P_1$ marking the end of the rectilinear trajectory part traversed by the slave aircraft and terminating at a point $P_2$ marking the start of the rectilinear trajectory part traversed by the master aircraft, is taken equal to the sum of the distances separating the slave aircraft from the point $P_1$ and the point $P_2$ from the master aircraft plus the length L of the circular arc taken equal to:

$$L = r(\chi_s - \chi_P)$$

the headings $\chi_P$ and $\chi_S$ being expressed in radians.

Advantageously, the separation preset distance $D_{SEP}$ is deduced from a minimum timespan preset $\Delta T$ between the passings of the two aircraft (1, 2) through one and the same point of the trajectory by applying the relation:

$$D_{SEP} = \Delta T \times V_{TAS.S}$$

$V_{TAS.S}$ being the true speed of the slave aircraft in the air, known by the designation TAS speed stemming from the term "True Air Speed".

Advantageously, the separation preset distance $D_{SEP}$ is derived from a defining table giving it as a function of altitude.

Advantageously, the separation preset distance $D_{SEP}$ is a distance preset given by an air controller.

Advantageously, the location of the master aircraft is transmitted in a cooperative manner by the latter to the slave aircraft by means of an ADS-B system.

Advantageously, the slave aircraft acquires the location of the master aircraft by means of an onboard radar.

Advantageously, the slave aircraft acquires the location of the master aircraft by way of a ground-based locating station.

Figure 3:
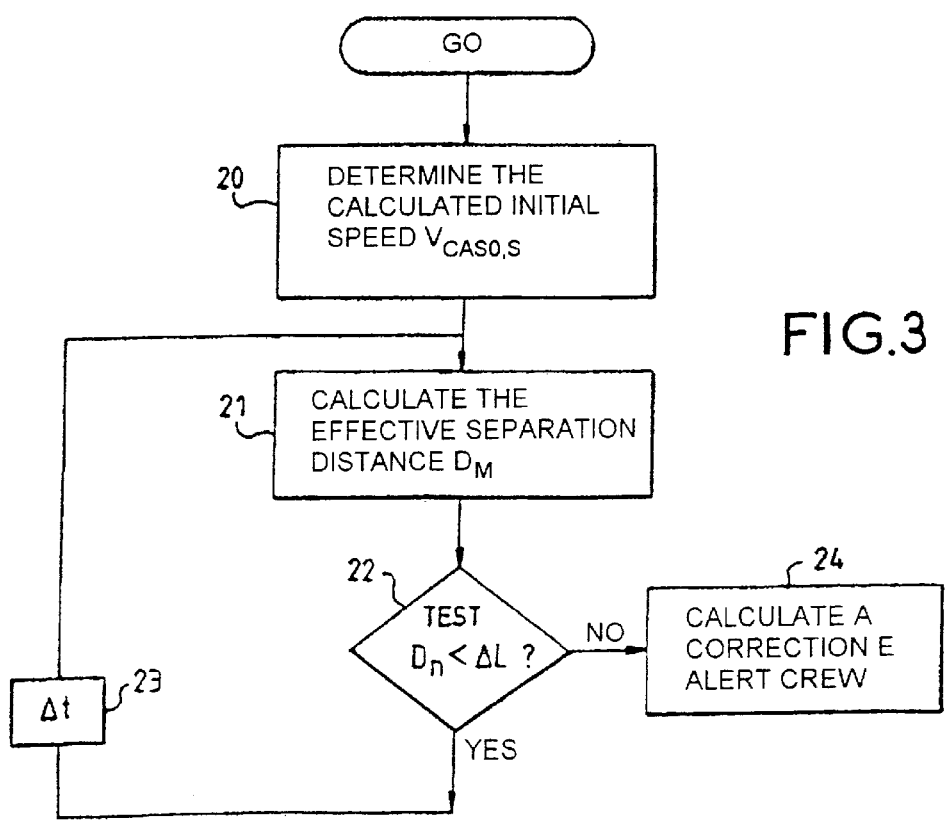
Figure 2:
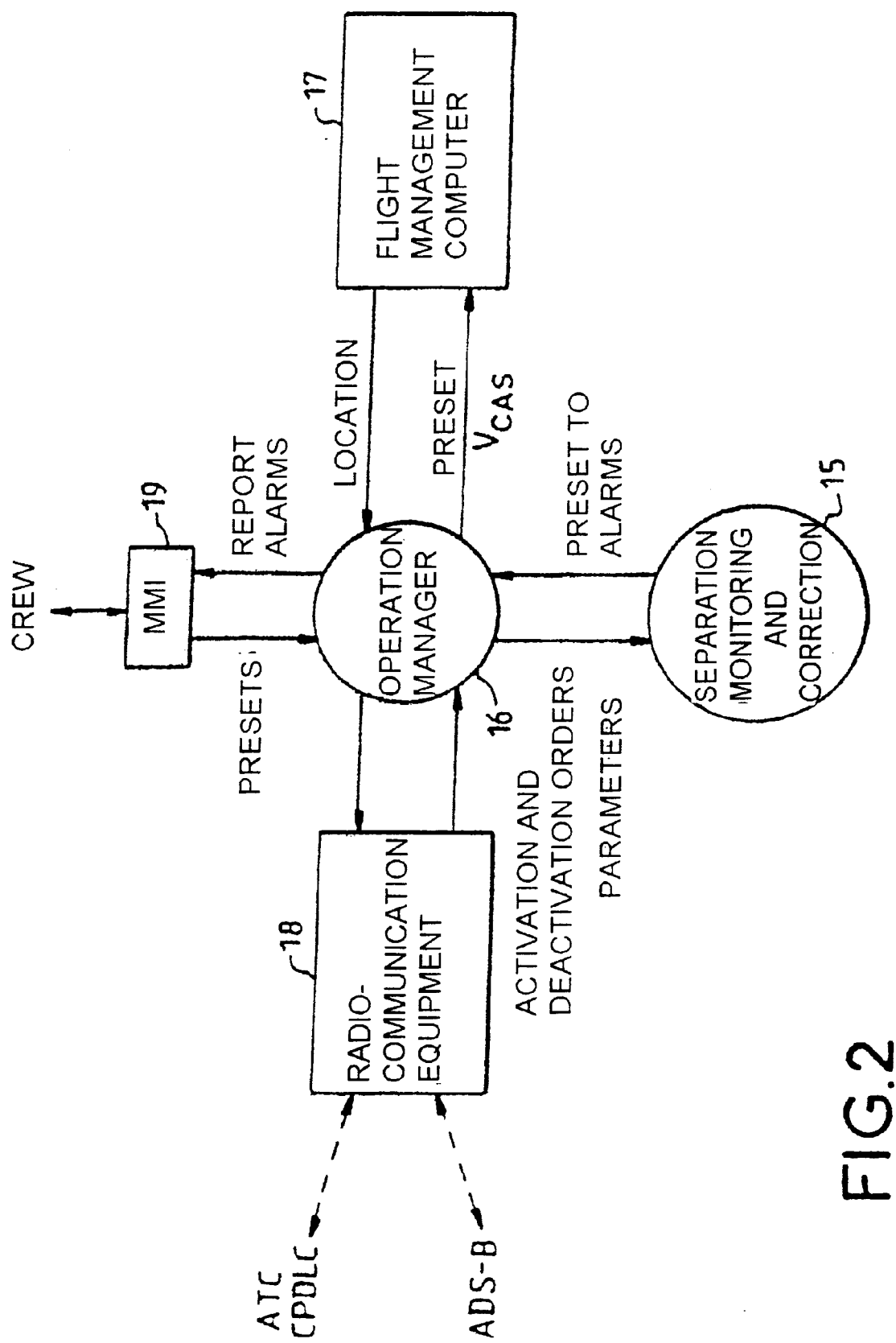

Other characteristics and advantages of the invention will emerge from the description below of an embodiment given by way of example. This description will be given in conjunction with the drawing, in which:

A FIG. 1 gives an example of traffic where two aircraft are to follow a common stretch of course and where a guidance process according to the invention is especially useful for simplifying the tasks of the pilots and air controllers, A FIG. 2 illustrates a possible apportioning of tasks within a computer carried onboard the follower aircraft, for the implementation of a guidance process according to the invention, and A FIG. 3 is a flowchart illustrating the main steps of a guidance process according to the invention.

FIG. 1 illustrates the example of two aircraft 1, 2 following two courses, one a, represented as a continuous line, and the other b, represented as a dashed line, following, in the same direction, a common stretch represented as a bold line and consisting of a linkup of two prescribed air traffic corridors 10 and 11. When they arrive at the common stretches 10, 11, the aircraft 1 and 2 must incorporate themselves into the existing traffic on these stretches without there being any risks of collision and hence comply with a minimum distance of separation between them and the various other aircraft already present. This compliance with a minimum distance of separation between aircraft, within an air traffic corridor, is achieved by visual monitoring by the aircraft crews and by regulation of the traffic by an air control entity in charge of the relevant air corridors, which gives speed presets to each aircraft for regular flow of the traffic complying with a minimum safety spacing between each aircraft. On account of the visual surveillance, the preset minimum spacing between aircraft is dependent on the visibility conditions, smaller for good visibility than for poor visibility, this coming into play especially in the phase of approach to a landing strip.

The increasing reliability of aircraft navigation equipment and the appearance of new locating and communicating systems of higher performance and greater accuracy such as ADS-B, currently allow accurate and reliable information to be made available onboard an aircraft regarding its location and its speed vector, and regarding the locations and speed vectors of the various aircraft flying nearby. An aircraft thus equipped is able to ascertain, at any instant, the distances between it and the various other aircraft flying nearby and even to make short and medium term forecasts regarding the changes in these distances so as to evaluate the risks of collision. When it forms a queue with other aircraft within a prescribed air corridor, such an aircraft is able to ascertain, at any instant, its distance from the aircraft which are closest in the queue, these being the one which precedes it and the one which follows it. It is proposed to use this information available onboard an aircraft to maintain longitudinal spacings between aircraft following one and the same air corridor, one behind the other.

More precisely, there is proposed a guidance process usable onboard an aircraft furnished with this kind of information, for automatic following, at a prescribed distance, of another aircraft preceding it over its trajectory. Specifically, all the longitudinal spacings separating the various aircraft travelling, following one behind the other, along one and the same air corridor can in fact be maintained by chained application of such a guidance process at the level of each of the aircraft with a view to maintaining its longitudinal spacing relative to the aircraft immediately preceding it.

Such chained application of a guidance process allowing each aircraft inserted into a queue to ensure maintenance of its spacing relative to the aircraft preceding it places the responsibility for regulating the traffic in the air corridor with the air traffic control authority which can intervene at any instant, by giving the various aircraft their priority speed presets.

In this chained application of such a guidance process, each aircraft of the queue should be regarded as belonging to two pairs, one pair in which it is the so-called "slave aircraft" since it applies the guidance process to maintain its spacing relative to the aircraft preceding it in the queue, and one pair in which it is the so-called "master aircraft" since it serves as tag for the aircraft following it in the queue for applying the guidance process.

For the description of the guidance process consideration will be given to one of these pairs of aircraft such as the aircraft 1 and 2 traversing the common course portions 10 and 11 in FIG. 1. The aircraft 1 which is the first along the route and which serves as tag for the aircraft 2 is the master aircraft. The aircraft 2 which is the second along the route and which must maintain its spacing relative to the aircraft 1 preceding it is the slave aircraft. Naturally, FIG. 1 is merely an exemplary situation, the common course portions 10, 11 possibly also being portions of a prescribed corridor for the approach to a runway.

This process has two main successive phases: an initialization phase and a feedback control phase.

During the initialization phase, which begins an implementation of the process, the slave airplane 2 takes an initial value of calculated air speed $V_{CAS0,S}$.

The calculated air speed is a quantity which is well known in aeronautics. It corresponds to the aircraft's air speed deduced from the measurements of temperature and of static and dynamic pressures, by applying fundamental laws of aerodynamics. This calculated air speed is not the true air speed since it depends on the calibration of the dynamic and static pressure sensors which are performed for a zero altitude but it is related to the true air speed by a law which depends on the altitude, temperature and type of aircraft and which merges with it when the altitude of the aircraft approaches zero.

This initial value of calculated air speed $V_{CAS0,S}$ can be either:

- the calculated air speed scheduled during the preparation of the flight plan of the slave aircraft 2, at the place where it is situated at the moment of implementation of the guidance process, this calculated air speed resulting from the application of a 4D defining law, that is to say one which depends on the four variables: altitude, time, latitude and longitude, this case being tailored to the case of a descending aircraft, for example one approaching a runway,
- a calculated cruising air speed adopted to optimize consumption,
- the calculated air speed of the master aircraft 1 at the moment at which it passed substantially the same point of the trajectory, this calculated air speed of the master aircraft 2 being deduced from an estimation of the delay $\Delta T$ of the slave aircraft relative to the master aircraft and from a knowledge, via any means, for example via an ADS-B system, of the calculated air speed $V_{CAS,M}(t_0)$ of the master aircraft 1.

If $t_0$ is the instant at which the implementation of the process begins, the initialization phase can be defined by the relation:

$$V_{CAS,S}(t_0)=V_{CAS0,S}(t_0)$$

The process continues, after this initialization phase, with a phase of feedback control of the calculated air speeds $V_{CAS,S}$ of the slave aircraft 2, with a view to bringing and maintaining, with greater or lesser accuracy, the spacing of the slave aircraft 2 relative to the master aircraft 1 along their common trajectory, to a preset value.

During this feedback control phase, the slave aircraft 2 which knows, at any instant or at neighboring instants, its location along the trajectory which it shares with the master aircraft 1, for example by virtue of its on-board navigation equipment, and the location of the master airplane 1 along their common trajectory, for example by virtue of an ADS-L system, and which moreover knows the shape of their common trajectory, periodically deduces therefrom an estimate or measure of its effective separation distance $D_M$ relative to the master aircraft 1 along their common trajectory as well as the discrepancy in this measured separation distance $D_M$ with a preset value $D_{SEP}$ and derives, with each capture of discrepancy, a correction term E which it applies to its calculated air speed $V_{CAS,S}$ in order to decrease this discrepancy or maintain it within a permitted span.

If $\Delta t$ is the periodicity of the correction, the feedback control phase can be defined by the relation $$V_{CAS,S}(t_0+k\Delta t)=V_{CAS,S}(t_0+(k-1)\Delta t)+E((D_{SEP}-D_M),(t_0+(k-1)\Delta t))$$

The correction term $E((D_{SEP}-D_M),(t_0+(k-1)\Delta t))$ must be such that the variation which it induces in the calculated air speed $V_{CAS,S}$ of the slave aircraft 2 tends to correct the value of the discrepancy, that is to say goes in the direction of increasing the calculated air speed $V_{CAS,S}$ of the slave aircraft 2 if the measured spacing distance $D_M$ tends to increase beyond the preset minimum value $D_{SEP}$ and in the direction of a decrease in the calculated air speed $V_{CAS,S}$ of the slave aircraft 2 if the measured spacing distance $D_M$ tends to drop below the preset minimum value $D_{SEP}$, with a feedback control time constant of the order of some thirty seconds. It may for example be of the form:

$$E((D_{SEP}-D_M),(t_0+(k-1)\Delta t))=S_{EP}\times M\times(D_{SEP}-D_M(t_0+(k-1)\Delta t))$$

where M is a coefficient of proportionality also ensuring consistency between distance and speed such that:

$$M = \frac{120 \text{ kts}}{1 \text{ NM}}$$

(kts designating a speed in knots and Nm a nautical mile) and $S_{EP}$ a binary coefficient taking a value 1 or 0 and making it possible to introduce a so-called effective margin of tolerance $\Delta L_e$, as a percent, in the measured separation distance $D_M$ relative to the preset value $D_{SEP}$ below which the corrective term E takes a zero value and above which the corrective term E takes a non zero value:

$$\begin{cases} S_{ep} = 1 \text{ if } \frac{|(D_M - D_{SEP})|}{D_{SEP}} \geq \Delta L_e \\ S_{ep} = 0 \text{ if } \frac{|(D_M - D_{SEP})|}{D_{SEP}} < \Delta L_e \end{cases}$$

This effective margin of tolerance $\Delta L_e$ makes it possible to disable the feedback control and hence to avoid modifications to the calculated air speed of the slave aircraft 2, thereby improving the comfort of its passengers, while its distance of separation with the master aircraft 1 remains within reasonable limits. It is taken to be less than the preset tolerance margin $\Delta L_c$ prescribed by regulation:

$$\Delta L_e = k' \Delta L_c \text{ with } 0 < k' \leq 1$$

With the same objective of comfort, it is beneficial to introduce a hysteresis phenomenon around the effective margin of tolerance $\Delta L_e$, by giving the latter a reduced value with each detection of its overshoot, doing so for as long as the overshoot lasts. The binary coefficient $S_{EP}$ is then defined as follows:

$$\begin{cases} S_{ep} = 1 \text{ if } \begin{cases} \frac{|(D_M - D_{SEP})|}{D_{SEP}} > k' \times \Delta L_c \text{ and } S_{ep} = 0 \text{ a priori} \\ \text{or} \\ \frac{|(D_M - D_{SEP})|}{D_{SEP}} > k'' \times \Delta L_c \text{ and } S_{ep} = 1 \text{ a priori} \end{cases} \\ \text{and} \\ S_{ep} = 0 \text{ if } \begin{cases} \frac{|(D_M - D_{SEP})|}{D_{SEP}} < k'' \times \Delta L_c \text{ and } S_{ep} = 1 \text{ a priori} \\ \text{or} \\ \frac{|(D_M - D_{SEP})|}{D_{SEP}} < k' \times \Delta L_c \text{ and } S_{ep} = 0 \text{ a priori} \end{cases} \end{cases}$$

with:

$$0 < k'' < k' \leq 1$$

The coefficient k', the so-called safety coefficient since it prevents the effective tolerance margin $\Delta L_e$ from reaching the preset tolerance margin $\Delta L_c$, can be taken equal to 0.8 while the hysteresis coefficient k" can be taken equal to 0.5.

The periodic computing of the correction in calculated airspeed $V_{CAS,S}$ of the slave aircraft 2, so as to maintain its longitudinal distance of separation relative to the master aircraft 1 within a permitted span involves knowing the preset minimum distance of separation $D_{SEP}$ and the effective distance of separation $D_M$.

The preset minimum separation distance $D_{SEP}$ can be given in an explicit form, for example a distance fixed by an air controller ensuring regulation of the traffic in the relevant air corridor:

$$D_{SEP} = f \text{ (controller)}$$

or in an implicit form, for example based on a defining table taking account of the altitude of the slave aircraft 2:

$$D_{SEP} = f \text{ (altitude)}$$

or based on a separation time $\Delta T$ between two aircraft passing through one and the same point, this requiring, on the part of the slave aircraft 2, a determination of the value of the preset minimum separation distance $D_{SEP}$ on the basis of the separation time $\Delta T$ and its true air speed $V_{TAS,S}$ through the relation:

$$D_{SEP} = \Delta T \times V_{TAS,S}$$

the slave aircraft 2 deducing its true air speed $V_{TAS,S}$ from its calculated air speed $V_{CAS,S}$ through a law which depends on altitude and temperature.

The effective separation distance $D_M$ is calculated by the slave aircraft by taking account of its position and that of the master aircraft along the trajectory which they describe in common. Its geographical position can be supplied to it by various means, for example its own navigation equipment. The geographical position of the master aircraft can be communicated to it by means of a cooperative communication system such as ADS-B, but it may also be supplied to it by a non cooperative system such as an onboard radar or even by a ground radar. The shape of the trajectory traversed in common by the master and slave aircraft is a given since it is a prescribed air corridor. The latter generally consists of a succession of rectilinear segments joined by circular arcs allowing aircraft to change heading between two rectilinear segments.

In the case where the two aircraft are on one and the same rectilinear segment of their common trajectory, the slave aircraft 2 measures its longitudinal distance relative to the master aircraft 1 by considering that the two aircraft are on one and the same terrestrial great circle and by applying the relation:

$$D_M = R \times \text{Arc } \cos(\cos(Lat_M) \times \cos(Lat_S) \times \cos(Long_M - Long_S) + \sin(Lat_M) \times \sin(Lat_S)) \quad (1)$$

$Lat_M$ and $Long_M$ defining the geographical position of the master aircraft, $Lat_S$ and $Long_S$ the geographical position of the slave aircraft and R being the radius of the earth.

Regarding the two aircraft to be on one and the same terrestrial great circle amounts to neglecting the altitude differences and to considering only the horizontal component of the distance of separation. This approximation is acceptable since it leans towards underestimating the apparent distance separating the two aircraft and does not go counter to safety.

In the case where the two aircraft are not on one and the same rectilinear portion of their common trajectory but on two rectilinear portions separated by a turn, the slave aircraft 1 measures its distance relative to the master aircraft 2 in several steps.

It measures the distance separating it from the end of the rectilinear segment where it is situated by applying relation (1), replacing in the latter the geographical position of the master aircraft (1) by that of the end point of the rectilinear segment where it is situated.

It calculates the length of the turn through the relation:

$$L = r \, (\chi_S - \chi_P) \quad (2)$$

$\chi_P$ and $\chi_S$ being the headings, expressed in radians, of the two rectilinear segments joined by the turn and r the radius of the turn.

It measures the distance which separates the master aircraft 1 from the start of the rectilinear segment where it is situated by applying relation (1), replacing in the latter its geographical position by that of the point of origin of the rectilinear segment traversed by the master aircraft.

Finally it adds together all the distances obtained, thereby giving it its longitudinal separation distance relative to the master aircraft.

If the two aircraft are no longer situated on one and the same rectilinear segment, the one being there, but the other being in a turn, before or after this rectilinear segment, the slave aircraft 2 calculates its longitudinal separation distance with respect to the master aircraft 1 in a manner similar to that above for the portion of rectilinear segment to be traversed or remaining to be traversed by one of the two aircraft. On the other hand, for the length of the turn remaining to be finished or already embarked on, it uses relation (2), replacing in the latter the heading of the rectilinear segment which it has left or has not yet reached by the angle $\chi$ in radians between North and the straight line passing through the center of the turn and the position of the aircraft in the turn, obtained through the relation $$\chi = \arctan\left(\frac{(long1 - long0) \times \frac{\cos(lat1 - lat0)}{2}}{lat1 - lat0}\right)$$

lat1, long1 being the coordinates of the aircraft and lat0, long0 those of the center of the turn.

FIG. 2 illustrates a software organization allowing the implementation of the guidance process just described, by an onboard computer which moreover can execute other tasks participating in flight management. This software organization is based on two software layers, the lower 15 termed "Separation Monitoring and Correction" and the upper 16 termed "Operation Manager".

The "Separation Monitoring and Correction" lower software layer 15 ensures execution of the various steps of the guidance process:

- determination of the initial value of the calculated air speed if it is not available explicitly,
- updating and determination of the preset minimum separation distance if the latter is not explicit,
- periodic measurement of the longitudinal distance of separation from the master aircraft,
- determination of the discrepancy existing between the measured longitudinal distance and the preset minimum separation distance,
- computation of a correction of the calculated air speed so as to maintain the discrepancy within a permitted span, and
- issuing of a possible alarm in the event of noncompliance with the preset minimum distance.

The "Operation Manager" upper layer 16 ensures dialog between the "Separation Monitoring and Correction" lower software layer 10 and the equipment of the aircraft: flight management computer 17 for following the corrections of the calculated air speed, radiocommunication apparatus 18 for monitoring nearby traffic (ADS-B) and for exchanging traffic information with the ATC network, MMI equipment 19 forming an interface with the crew, etc. It detects a request for the taking of responsibility by the aircraft for compliance with a minimum distance of separation relative to another designated aircraft, emanating either from the crew by way of the MMI equipment 19, or from an air traffic control authority which sends its request from an air traffic control center ATC, by way of the CPDLC "Control Pilot Data Link Communication" channel. It then has this request executed by the "Separation Monitoring and Correction" lower software layer by supplying it with the necessary information, whether this information originates from the aircraft's navigation equipment or from the vicinity of the aircraft by way of the aircraft's radiocommunication equipment 18 as well as the necessary interfaces with the other equipment of the aircraft. It also detects the orders for interrupting the taking of responsibility by the aircraft for compliance with a minimum distance from another aircraft and transmits to the crew an execution report and any alarm related to noncompliance with the minimum distance.

FIG. 3 is a flowchart illustrating the main steps of the guidance process such as they are implemented by the "Separation Monitoring and Correction" lower software layer 15. Upon an order from the "Operation Manager" upper software layer 16, the "Separation Monitoring and Correction" lower software layer 15 initializes the guidance process at 20, by choosing the initial value adopted for the calculated air speed of the aircraft VCAS0,S which is transmitted as preset to the flight management computer by the "Operation Manager" upper software layer 16. It calculates at 21 the distance $D_M$ separating the aircraft from that chosen for the master aircraft, tests at 22 whether this separation distance $D_M$ lies within an allowed tolerance bracket $\Delta L$ relative to a preset value $D_{SEP}$ which may possibly be dependent on altitude and on a separation time interval relative to the master aircraft and, depending on the results of the test, either, if the bracket is complied with, does nothing and triggers a timer 23 before recommencing at step 21, at the level of calculating the distance $D_M$, or, notes that the bracket is not complied with and computes at 24 a correction term for the calculated air speed of the aircraft so as to bring its distance of separation into the allowed tolerance bracket while alerting the crew of a modification of preset of calculated air speed to the flight management computer.

What is claimed is:

1. A process for guiding a so-called slave aircraft (2) in the context of a convoy flight, behind another so-called master aircraft (1), on one and the same predetermined trajectory and with a preset minimum separation distance $D_{SEP}$, characterized in that it consists in giving the calculated air speed $V_{CAS,S}$ of the slave aircraft (2) an initial value $V_{CAS0,S}$, in periodically deducing the distance separating the slave aircraft (2) from the master aircraft (1) from the geographical position of the slave aircraft (2) and from that of the master aircraft (1) at one and the same instant, and from the known shape of the trajectory followed by the master (1) and slave (2) aircraft, then in periodically correcting the calculated air speed $V_{CAS,S}$ of the slave aircraft (2) by modifying it with a corrective term E derived from the discrepancy noted between the measured separation distance D and the preset minimum separation distance $D_{SEP}$, this guidance process being defined by a recurrence relation of the form:

$$\begin{cases} V_{CAS,S}(t_0) = V_{CAS0,S}(t_0) \\ V_{CAS,S}(t_0 + k\Delta t) = V_{CAS,S}(t_0 + (k-1)\Delta t) + \\ \quad E((D_{SEP} - D_M), (t_0 + (k-1)\Delta t)) \end{cases}$$

$\Delta t$ being the periodicity of the correction, $D_M$ and $D_{SEP}$ values updated at the instant $(t_0 + (k-1)\Delta t)$.

2. The process as claimed in claim 1, characterized in that the initial value of the calculated air speed of the slave aircraft (2) is taken equal to the calculated air speed scheduled during the preparation of the flight plan of the slave aircraft (2) at the place where it is situated at the moment of implementation of the guidance process, this calculated air speed resulting from the application of a 4D defining law dependent on the four variables: altitude, time, latitude and longitude.

3. The process as claimed in claim 1, characterized in that the initial value of the calculated air speed of the slave aircraft (2) is taken equal to a calculated air speed adopted by the slave aircraft (2) when cruising.

4. The process as claimed in claim 1, characterized in that the initial value of the calculated air speed of the slave aircraft (2) is taken equal to the calculated air speed of the master aircraft (1) at the moment at which it passed substantially the same point of the trajectory.

5. The process as claimed in claim 1, characterized in that, one is given a so-called effective margin of tolerance $\Delta L_e$, as a percent, in the measured distance $D_M$ relative to the preset distance $D_{SEP}$ below which the corrective term E takes a zero value and above which the corrective term takes a non zero value.

6. The process as claimed in claim 5, characterized in that a hysteresis phenomenon is introduced around the effective margin of tolerance $\Delta L_e$, by giving the latter a reduced value upon each detection of its overshoot, doing so as long as the overshoot lasts.

7. The process as claimed in claim 5, characterized in that, in the case where there is a preset margin of tolerance $\Delta L_c$, an effective tolerance margin $\Delta L_e$ which is stricter than the preset tolerance margin $\Delta L_c$ is adopted by applying a positive safety coefficient k' of less than 1 to the preset tolerance margin $\Delta L_c$:

$$\Delta L_e = k' \Delta L_c \text{ with } 0 < k' \leq 1$$

8. The process as claimed in claim 7, characterized in that the safety coefficient k' is taken equal to 0.8.

9. The process as claimed in claim 7, characterized in that a hysteresis phenomenon is introduced around the effective tolerance margin $\Delta L_e$ by giving the latter, when it has just been overshot and for as long as it is overshot, a reduced value deduced from the preset tolerance margin $\Delta L$, by applying a positive hysteresis coefficient k" of less than the safety coefficient k.

10. The process as claimed in claim 9, characterized in that the hysteresis coefficient k" is taken equal to 0.5.

11. The process as claimed in claim 1, characterized in that the corrective term E is taken proportional to the discrepancy noted between the measured separation distance D and the preset minimum separation distance $D_{SEP}$ with a coefficient of proportionality p taken equal to:

$$p = S_{ep} \times M$$

with:

$$S_{ep} = 1 \text{ if } \begin{cases} \frac{|(D_M - D_{SEP})|}{D_{SEP}} > k' \times \Delta L_c \text{ and } S_{ep} = 0 \text{ a priori} \\ \text{or} \\ \frac{|(D_M - D_{SEP})|}{D_{SEP}} > k'' \times \Delta L_c \text{ and } S_{ep} = 1 \text{ a priori} \end{cases}$$

and $$S_{ep} = 0 \text{ if } \begin{cases} \frac{|(D_M - D_{SEP})|}{D_{SEP}} < k'' \times \Delta L_c \text{ and } S_{ep} = 1 \text{ a priori} \\ \text{or} \\ \frac{|(D_M - D_{SEP})|}{D_{SEP}} < k' \times \Delta L_c \text{ and } S_{ep} = 0 \text{ a priori} \end{cases}$$

$\Delta L_c$ being a preset tolerance percentage, k' a positive safety coefficient less than one, k" a hysteresis coefficient and M a consistency coefficient for making the distance homogeneous in relation to the speed.

12. The process as claimed in claim 11, characterized in that the consistency coefficient M is taken equal to:

$$M = \frac{120 \text{ kts}}{1 \text{ NM}}$$

kts being a speed in knots and Nm a nautical mile.

13. The process as claimed in claim 1, characterized in that the measured separation distance $D_M$ is the horizontal component of the effective separation distance.

14. The process as claimed in claim 1, characterized in that the measured separation distance $D_M$ separating, at a given instant, the slave aircraft (2) from the master aircraft (1) on a rectilinear trajectory, is derived from the locations of the master (1) and slave (2) aircraft by means of the relation:

$$D_M = R \times Arccos(\cos(Lat_M) \times \cos(Lat_s) \times \cos(Long_M - Long_s) + \sin(Lat_M) \times \sin(Lat_s))$$

$Lat_M$ and $Long_M$ defining the geographical position of the master aircraft (1), $Lat_s$ and $Long_s$ the geographical position of the slave aircraft (2) and R being the radius of the earth.

15. The process as claimed in claim 1, characterized in that the measured separation distance $D_M$ separating, at a given instant, the slave aircraft (2) from the master aircraft (1) while the slave aircraft (2) is situated on a rectilinear part, with heading $\chi_p$, of the trajectory followed by the two aircraft, and the master airplane (1) on another rectilinear part, with heading $\chi_s$, of this trajectory, which are joined together by an arc of a circle of radius r, starting at a point $P_1$ marking the end of the rectilinear trajectory part traversed by the slave aircraft (2) and terminating at a point $P_2$ marking the start of the rectilinear trajectory part traversed by the master aircraft (1), is taken equal to the sum of the distances separating the slave aircraft (2) from the point $P_1$ and the point $P_2$ from the master aircraft (1) plus the length L of the circular arc taken equal to:

$$L = r(\chi_s - \chi_p)$$

the headings $\chi_p$ and $\chi_s$ being expressed in radians.

16. The process as claimed in claim 1, characterized in that the separation preset distance $D_{SEP}$ is deduced from a minimum timespan preset ΔT between the passings of the two aircraft (1, 2) through one and the same point of the trajectory by applying the relation:

$$i\ D_{SEP} = \Delta T \times V_{TAS,S}$$

$V_{TAS,S}$ being the true speed of the slave aircraft (2) in the air.

17. The process as claimed in claim 1, characterized in that the separation preset distance $D_{SEP}$ is derived from a defining table giving it as a function of altitude.

18. The process as claimed in claim 1, characterized in that the separation preset distance $D_{SEP}$ is a distance preset given by an air controller.

19. The process as claimed in claim 1, characterized in that the location of the master aircraft (1) is transmitted in a cooperative manner by the latter to the slave aircraft (2) by means of an ADS-B system.

20. The process as claimed in claim 1, characterized in that the slave aircraft (2) acquires the location of the master aircraft (1) by means of an onboard radar.

21. The process as claimed in claim 1, characterized in that the slave aircraft (2) acquires the location of the master aircraft (1) from a ground-based locating station.

* * * * *